United States Patent
Gupta et al.

(10) Patent No.: US 11,132,400 B2
(45) Date of Patent: Sep. 28, 2021

(54) DATA CLASSIFICATION USING PROBABILISTIC DATA STRUCTURES

(71) Applicant: Microsoft Technology Licensing, LLC, Redmond, WA (US)

(72) Inventors: Aditya Gupta, Redmond, WA (US); Saikat Guha, Seattle, WA (US); Steven Peter Herbert, Woodinville, WA (US); Boris Asipov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 16/043,067

(22) Filed: Jul. 23, 2018

(65) Prior Publication Data
US 2020/0026803 A1   Jan. 23, 2020

(51) Int. Cl.
*G06F 16/00* (2019.01)
*G06F 16/901* (2019.01)
*G06N 7/00* (2006.01)

(52) U.S. Cl.
CPC .......... *G06F 16/901* (2019.01); *G06N 7/005* (2013.01)

(58) Field of Classification Search
None
See application file for complete search history.

(56) References Cited

U.S. PATENT DOCUMENTS 7,730,058 B2   6/2010 Sareen et al.
7,930,547 B2   4/2011 Hao et al.
2005/0195832 A1*   9/2005 Dharmapurikar ... H04L 45/7457
  370/395.31
2012/0246301 A1*   9/2012 Vyrros ................... A63F 13/335
  709/224
2013/0185445 A1*   7/2013 Larkin ................ H04L 65/1069
  709/228
2013/0212296 A1*   8/2013 Goel .................... H04L 45/7453
  709/238

OTHER PUBLICATIONS

"Bloom Filter", Retrieved from https://en.wikipedia.org/w/index.php?title=Bloom_filter&oldid=846502261, Jun. 19, 2018, 18 Pages.
"International Search Report and Written Opinion Issued in PCT Application No. PCT/US19/037830", dated Aug. 19, 2019, 14 Pages.

* cited by examiner

*Primary Examiner* — Thu Nguyet T Le
(74) *Attorney, Agent, or Firm* — Alleman Hall Creasman & Tuttle LLP

(57) ABSTRACT

According to one aspect of the present disclosure, a computing device is provided, including non-volatile memory storing a database including a plurality of database entries. The computing device may further include a processor configured to sort the plurality of database entries into a plurality of database entry length sets. For each database entry length set, each database entry included in the database entry length set may be within a predefined length range. For each database entry length set, the processor may be further configured to generate a probabilistic data structure based on the one or more database entries included in the database entry length set.

18 Claims, 7 Drawing Sheets

DATA CLASSIFICATION USING PROBABILISTIC DATA STRUCTURES

BACKGROUND

It sometimes can be necessary or desirable to search disparate databases for certain types of information. For example, in order to comply with privacy policies or regulations, it may sometimes be necessary or desirable to search databases for personally identifying information, for example, so that such information can be removed from the databases, or handled in a particular manner. In existing methods of database searching, a target type of information such as personally identifying information in a database is typically identified via regular expression matching. However, when searching a very large database (e.g. millions or billions of entries), regular expression matching may be prohibitively slow.

In addition, regular expression matching may find database entries that fit the pattern specified in the regular expression but are not personally identifying information. For example, if a search is performed for 32-digit universally unique identifiers (UUIDs) associated with users, regular expression matching may identify any 32-digit string as personally identifying information, which is not true as there are many other such uses for UUIDs. Thus, the false positive rate of regular expression matching may be high, which can be extremely problematic when examining millions or billions of databases.

SUMMARY

According to one aspect of the present disclosure, a computing device is provided, including non-volatile memory storing a database including a plurality of database entries. The computing device may further include a processor configured to sort the plurality of database entries into a plurality of database entry length sets. For each database entry length set, each database entry included in the database entry length set may be within a predefined length range. For each database entry length set, the processor may be further configured to generate a probabilistic data structure based on the one or more database entries included in the database entry length set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
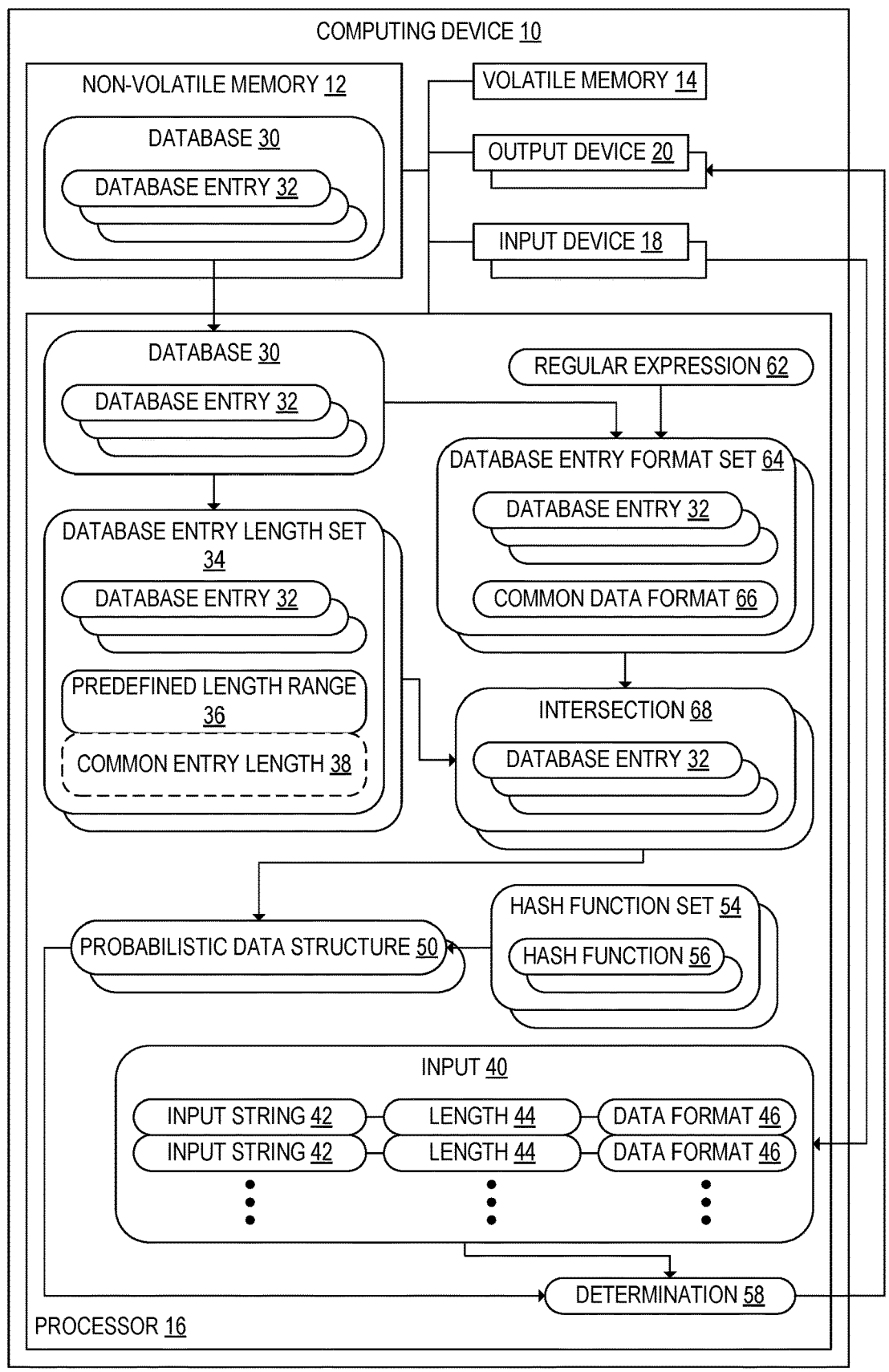
FIG. 1 shows a schematic depiction of an example computing device including non-volatile memory and a processor, according to one embodiment of the present disclosure.

In order to address the challenges discussed above, a computing device 10 is provided, as depicted in FIG. 1. The computing device 10 may include non-volatile memory 12, which may store a database 30 including a plurality of database entries 32. The computing device 10 may further include volatile memory 14. The computing device 10 may further include a processor 16, which may be operatively coupled to the non-volatile memory 12 and/or the volatile memory 14. In addition, the computing device 10 may include one or more input devices 18. For example, the one or more input devices 18 may include one or more of a touchscreen, a keyboard, a trackpad, a mouse, a button, a microphone, a camera, an accelerometer, and/or one or more other input devices 18. In some embodiments, the computing device 10 may additionally or alternatively include one or more output devices 20, which may include one or more of a display, a speaker, a haptic feedback device, and/or one or more other output devices 20.

As shown in FIG. 1, the processor 16 may be configured to sort the plurality of database entries 32 included in the database 30 into a plurality of database entry length sets 34. For each database entry length set 34, each database entry 32 included in the database entry length set 34 may be within a predefined length range 36. In some embodiments, for each database entry length set 34, each database entry 32 included in the database entry length set 34 may have a common entry length 38. In such embodiments, the common entry length 38 is a predefined length range 36 that is limited to a single length. In other embodiments, the predefined length range 36 may include a plurality of lengths (e.g. eight to twelve characters).

For each database entry length set 34, the processor 16 may be further configured to generate a probabilistic data structure 50 based on the one or more database entries 32 included in the database entry length set 34. In some embodiments, the probabilistic data structure 50 may be a Bloom filter. Alternatively, the probabilistic data structure 50 may be a counting Bloom filter. Other types of probabilistic data structures 50 may alternatively be used. Bloom filters and counting Bloom filters have the advantage of not producing false negatives when querying for a database entry 32 that may be included in the database 30. In addition, Bloom filters and counting Bloom filters are efficient in both time and memory usage. Thus, a query which may be extremely time-consuming if performed using regular expression searching may be performed much more quickly on a Bloom filter or counting Bloom filter. Using a Bloom filter or a counting Bloom filter instead of a regular expression may also save time that would otherwise be required to determine a regular expression for which to search.

The respective probabilistic data structure 50 for each database entry length set 34 may be generated in some embodiments at least in part by applying a hash function set 54 including a plurality of hash functions 56 to the plurality of database entries 32 included in the database entry length set 34. In such embodiments, each hash function 56 included in the hash function set 54 may be applied to each database entry 32. In embodiments in which the probabilistic data structure 50 is a Bloom filter, the time complexity for adding or querying for a database entry 32 is O(k), where k is the number of hash functions 56. In addition, in such embodiments, the space complexity of the probabilistic data structure 50 is O(m), where m is the number of database entries 32 included in the probabilistic data structure 50.

Figure 2:
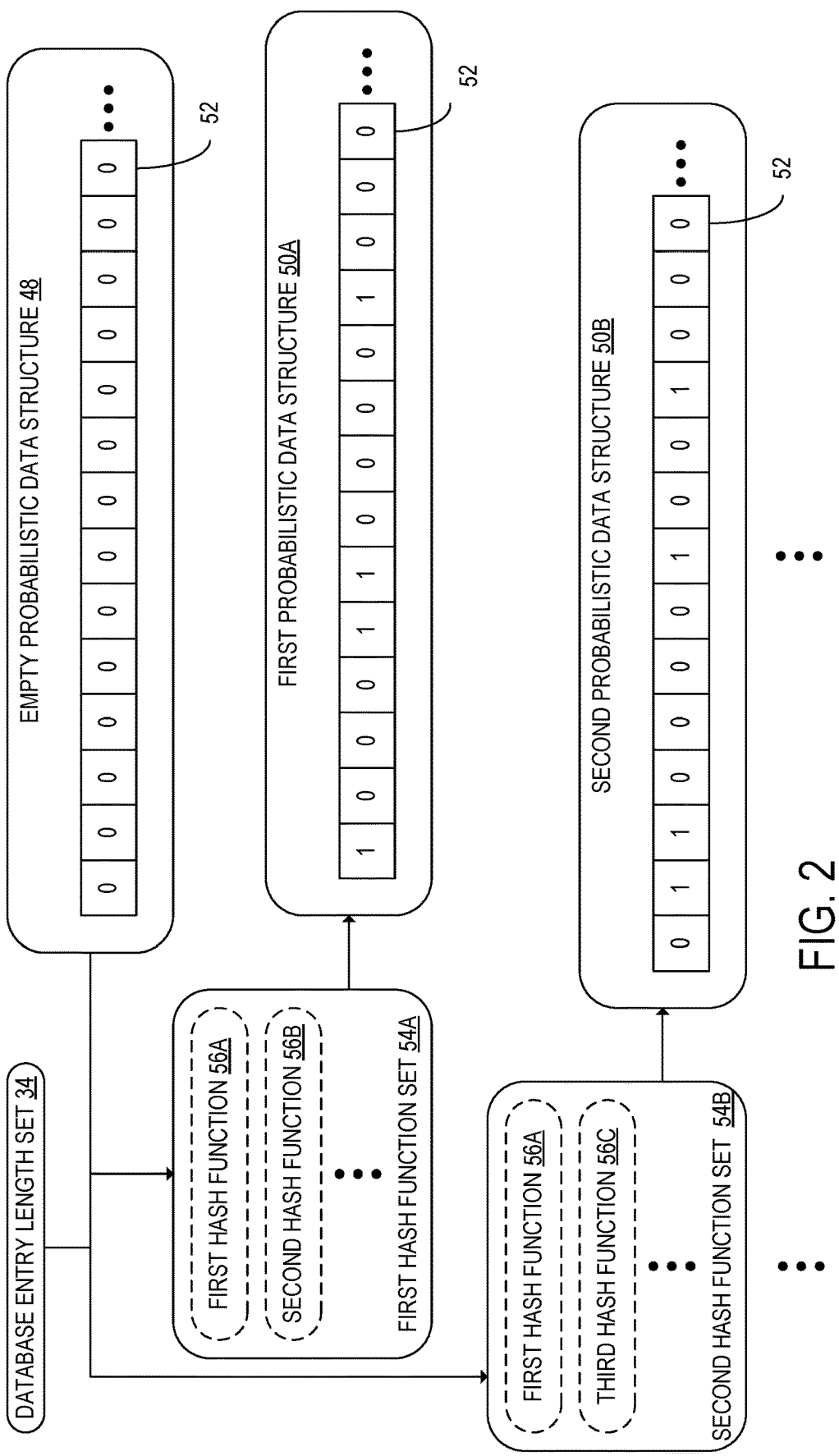
FIG. 2 shows an example of generating a plurality of probabilistic data structures using hash functions, according to the embodiment of FIG. 1.

In some embodiments, for each database entry length set 34, the processor 16 may be configured to generate a plurality of probabilistic data structures 50 based on the one or more database entries 32 included in the database entry length set 34. Generating a plurality of probabilistic data structures 50 may have the advantage of reducing a false positive rate for queries to the database 30, as discussed in further detail below. An example of generation of a plurality of probabilistic data structures 50 is shown in FIG. 2. In the embodiment of FIG. 2, the probabilistic data structure 50 is a Bloom filter. The probabilistic data structure 50 includes a plurality of positions 52, each of which may hold a bit set to 0 or 1. The probabilistic data structure 50 starts as an empty probabilistic data structure 48 in which each position holds a bit set to 0.

In the example of FIG. 2, each probabilistic data structure 50 is generated using a plurality of hash functions 56. A first hash function set 54A and a second hash function set 54B are each applied to each database entry 32 included in the database entry length set 34 to generate a respective first probabilistic data structure 50A and second probabilistic data structure 50B. The plurality of hash functions 56 used to generate each probabilistic data structure 50 may be distinct from the plurality of hash functions 56 used to generate each other probabilistic data structure 50 of the plurality of probabilistic data structures 50. In the example of FIG. 2, the first hash function set 54A used to generate the first probabilistic data structure 50A includes at least a first hash function 56A and a second hash function 56B. The second hash function set 54B used to generate the second probabilistic data structure 50B, on the other hand, includes the first hash function 56A and the third hash function 56C but not the second hash function 56B.

According to the example of FIG. 2, in which the probabilistic data structures 50A and 50B are Bloom filters, generating each probabilistic data structure includes, for each database entry 32 included in the database entry length set 34, applying each hash function 56 included in the respective hash function set 54 to the database entry. The hashed database entry is then entered into the probabilistic data structure 50 by setting one or more positions 52 of the probabilistic data structure 50 to 1. In embodiments in which the probabilistic data structure is a counting Bloom filter, each position 52 in the probabilistic data structure 50 may be represented by a plurality of bits representing an integer rather than a by single bit. In such embodiments, adding a hashed database entry to the probabilistic data structure 50 may include incrementing the integer by 1.

Returning to FIG. 1, the processor 16 may be further configured to receive an input 40 including one or more input strings 42. For example, the input 40 may include one or more database entries 32 from a different database 30. In some embodiments, the input 40 may further include metadata related to the one or more input strings 42 and/or the database 30. The input 40 may be an instruction to query the database 30 in order to determine whether each input string 42 of the one or more input strings 42 is included in the database. Each input string 42 may have an associated length 44 and data format 46. Note that although the term "input string" is used, the input string 42 may have some other data format 46, such as integer or floating-point number. In some embodiments, the input string 42 may be converted to a string from some other data type.

For each input string 42 of the one or more input strings 42, the processor 16 may be further configured to determine the length 44 of the input string 42. The processor 16 may be further configured to identify a database entry length set 34 for which the predefined length range 36 includes the length 44 of the input string 42. In embodiments in which each database entry 32 included in the database entry length set 34 has a common entry length 38, the processor 16 may determine that the input string 42 has the common entry length 38.

The processor 16 may be further configured to determine whether the input string 42 is included in the probabilistic data structure 50 of the database entry length set 34. For example, when the probabilistic data structure 50 is a Bloom filter, the processor 16 may be configured to determine whether an input string 42 is included in the probabilistic data structure 50 by applying each hash function 56 included in the hash function set 54 to the input string 42 and checking whether each position 52 in the probabilistic data structure 50 is set to 0 or 1. If any of the positions are set to 0, the processor 16 may determine that the input string 42 is not included in the probabilistic data structure 50. If each position 52 is set to 1, the processor 16 may determine that the probabilistic data structure 50 may include the input string 42.

In embodiments in which the probabilistic data structure 50 is a Bloom filter, when the processor 16 determines whether an input string 42 is included in the database 30, a false positive may result due to a hash collision. Such a hash collision may occur when each position 52 indicated by the hashed input string is set to 1 as a result of one or more other input strings 42 being added to the probabilistic data structure 50. Thus, the input string 42 may appear to be included in the database 30 when it is actually not included.

In order to reduce the false positive rate for queries to the database 30, the processor 16 may generate a plurality of probabilistic data structures 50 for each database entry length set 34, as shown in FIG. 2. When the processor 16 determines whether an input string 42 is included in the database entry length set 34, the processor 16 may query each probabilistic data structure 50 generated for that database entry length set 34. If the hashed input string indicates a position 52 set to 0 in any of the probabilistic data structures 50, the processor 16 may determine that the input string 42 is not included in the database 30. Thus, in order to return a false positive, the input string 42 would have to be a false positive for each probabilistic data structure 50 queried.

Figure 3:
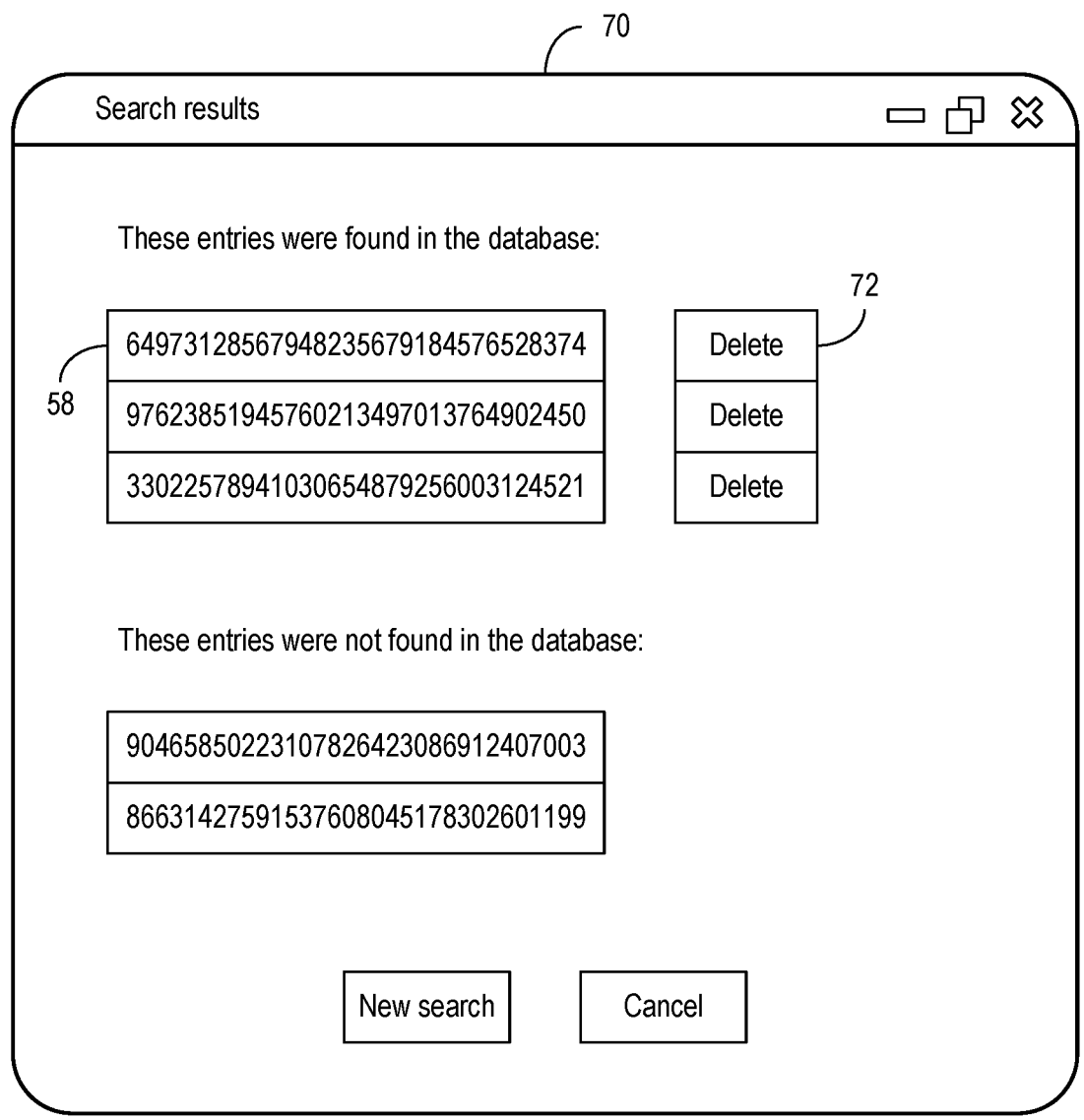
FIG. 3 shows an example search results window, according to the embodiment of FIG. 1.

Based on the determination of whether the input string 42 is included in the probabilistic data structure 50, the processor 16 may be further configured to output a determination 58 of whether the input string 42 is included in the database 30. A search results window 70 including a plurality of such determinations 58 is shown in FIG. 3. The search results window 70 may be displayed on a display of the computing device 10. In the example of FIG. 3, the one or more input strings 42 include five 32-digit UUIDs. Three of the 32-digit UUIDs were determined to be included in the database 30, and two of the 32-digit UUIDs were determined to not be included.

As shown in FIG. 3, in response to determining that an input string 42 is included in the database 30, the processor 16 may be further configured to output an option 72 to delete the input string 42 from the database 30. In response to receiving a selection of the option 72, the processor 16 may be further configured to delete the input string 42 from the database 30. The option 72 may be selected, for example, via one or more input devices 18 included in the computing device 10.

Returning to FIG. 1, in some embodiments, the processor 16 may be further configured to sort the plurality of database entries 32 into a plurality of database entry format sets 64. In some embodiments, the processor 16 may sort the plurality of database entries 32 into the plurality of database format sets 64 based at least in part on a regular expression 62. For example, when searching for one or more 32-digit UUIDs in a database 30 that includes large numbers of both database entries 32 that do not have a 32-digit data format 46 and database entries 32 that have a 32-digit data format 46, it may be desirable to first eliminate from consideration the database entries 32 that do not have the 32-digit data format 46. However, even when such database entries 32 are not considered, the remaining number of database entries 32 may still be too large to rely solely on regular expression searching to find the one or more 32-digit UUIDs. Thus, searching for the one or more database entries 32 using one or more probabilistic data structures 50 in addition to a regular expression 62 may save computing time.

For each database entry format set 64, each database entry 32 included in the database entry format set 64 may have a common data format 66. The processor 16 may be further configured to determine at least one intersection 68 between the plurality of database entry length sets 34 and the plurality of database entry format sets 64. For example, when searching the database for one or more Social Security numbers, the intersection 68 could include one or more database entries 32 that are eleven characters long and have the data format ###-##-####, where the "#" sign indicates a digit. For each intersection 68, the processor 16 may be further configured to generate the probabilistic data structure 50 based on the one or more database entries 32 included in the intersection 68. In some embodiments, the processor 16 may be configured to generate a plurality of probabilistic data structures 50 for the intersection. The plurality of probabilistic data structures 50 may be generated as discussed above with reference to FIG. 2.

In embodiments in which the processor 16 is configured to generate the probabilistic data structure 50 based on an intersection 68 between a database entry length set 34 and a database entry format set 64, the processor 16 may be further configured to receive an input 40 including one or more input strings 42. For each input string 42 of the one or more input strings 42, the processor 16 may be further configured to determine a length 44 of the input string 42 and determine a data format 46 of the input string 42.

In such embodiments, the processor 16 may be further configured to determine an intersection 68 of the database entry length set 34 and the database entry format set 64 for which the predefined length range 36 includes the length 44 of the input string 42 and the input string 42 has the common data format 66. For such an intersection 68, the processor 16 may be further configured to determine whether the input string 42 is included in the probabilistic data structure 50 of the intersection 68. In embodiments in which the processor 16 is configured to generate a plurality of probabilistic data structures 50 for the intersection 68, the processor may be further configured to determine whether the input string 42 is included in each probabilistic data structure 50.

The processor 16 may be further configured to output the determination 58 of whether the input string 42 is included in the database 30 based on the determination of whether the input string 42 is included in the probabilistic data structure 50 of the intersection 68. For example, the processor 16 may output a graphical user interface (GUI) including a search results window 70 indicating a respective determination 58 of whether each input string 42 is included in the database 30, as shown in FIG. 3.

Figure 4A:
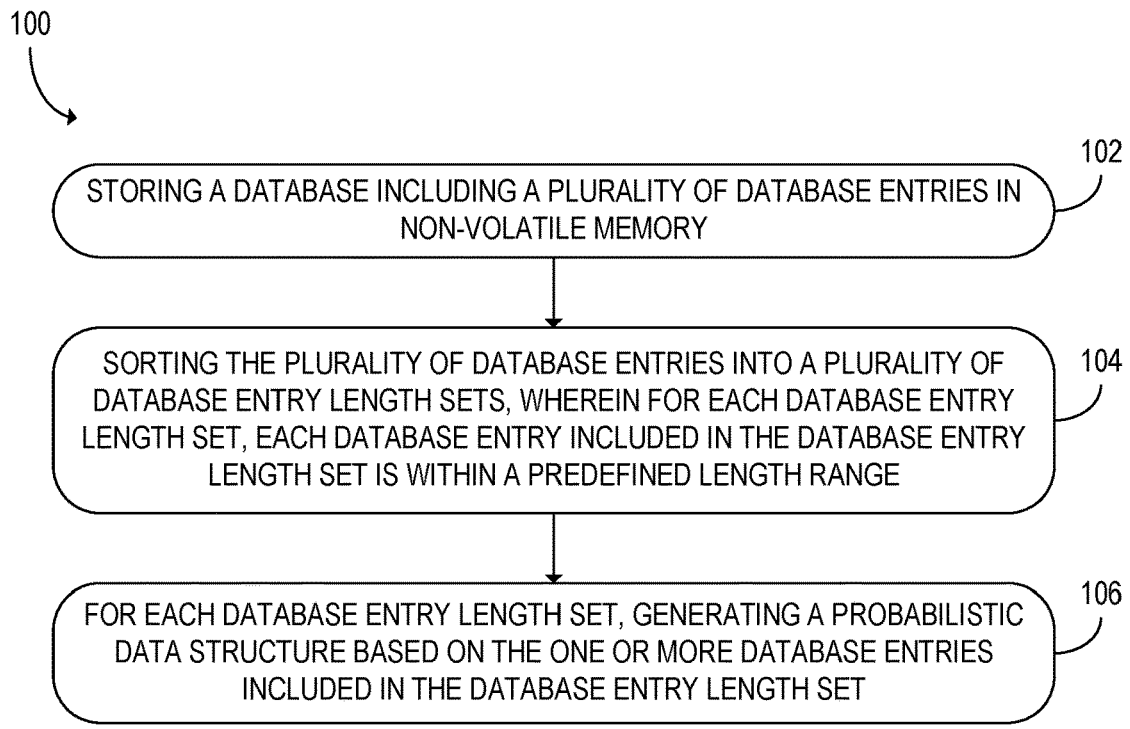
FIG. 4A shows a flowchart of a method for use with a computing device, according to the embodiment of FIG. 1.

FIG. 4A shows a flowchart of a method 100 for use with a computing device. The computing device with which the method is used may be the computing device 10 of FIG. 1 or may alternatively be some other computing device. The method 100 may include, at step 102, storing a database including a plurality of database entries in non-volatile memory of the computing device. In some embodiments, a plurality of databases may be stored in the non-volatile memory and steps included in the method 100 may be applied to the plurality of databases.

At step 104, the method 100 may further include sorting the plurality of database entries into a plurality of database entry length sets. For each database entry length set, each database entry included in the database entry length set may be within a predefined length range. In some embodiments, for one or more of the database entry length sets, each database entry included in the database entry length set may have a common entry length.

At step 106, the method 100 may further include, for each database entry length set, generating a probabilistic data structure based on the one or more database entries included in the database entry length set. In some embodiments, the probabilistic data structure may be a Bloom filter. Alternatively, the probabilistic data structure may be a counting Bloom filter or some other type of probabilistic data structure. Generating the probabilistic data structure may, in some embodiments, include applying one or more hash functions to the one or more database entries.

Figure 4B:
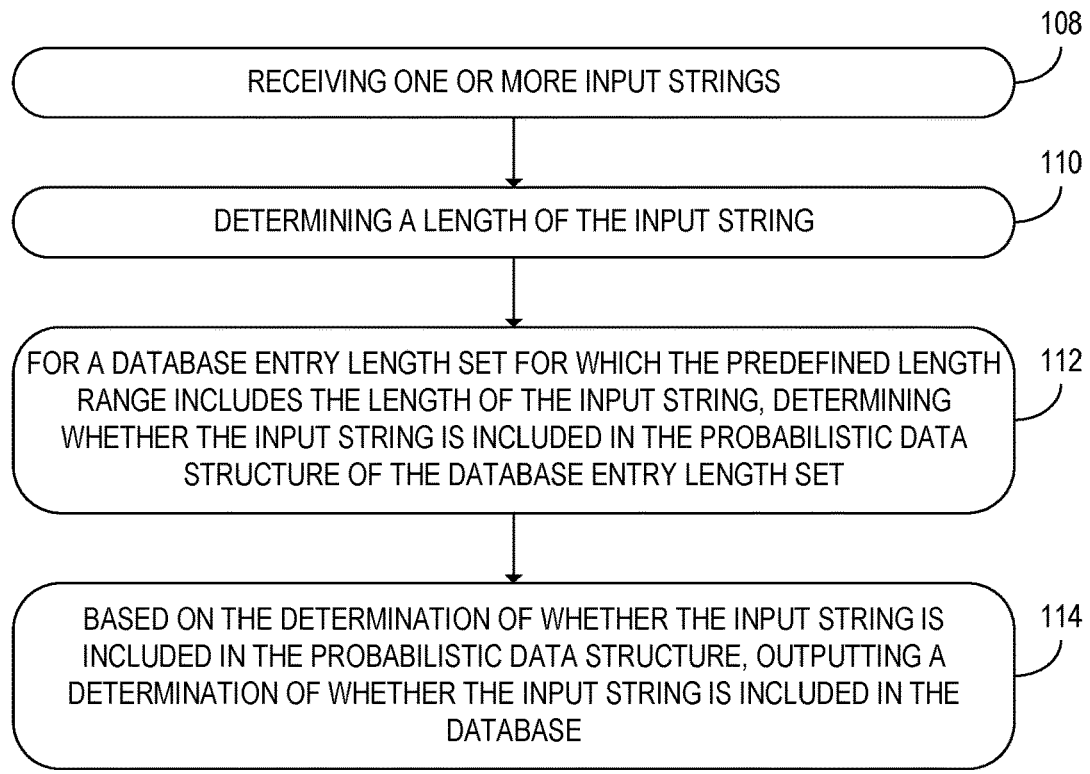
FIGS. 4B-F show additional steps that may be performed in some embodiments when performing the method of FIG. 4A.

FIGS. 4B-F show additional steps of the method 100 that may be performed in some embodiments. As shown in FIG. 4B, the method 100 may further include, at step 108, receiving one or more input strings. The one or more input strings may be included in an input that further includes additional data, such as metadata related to the one or more input strings. At step 110, the method 100 may further include, for each input string of the one or more input strings, determining a length of the input string. Step 112 of the method 100 may also be performed for each input string. At step 112, the method 100 may further include, for a database entry length set for which the predefined length range includes the length of the input string, determining whether the input string is included in the probabilistic data structure of the database entry length set. In some embodiments, determining whether the input string is included in the probabilistic data structure of the database entry length set may include applying the one or more hash functions to the input string and checking whether one or more positions in the probabilistic data structure match the hashed input string. The method 100 may further include, at step 114, outputting a determination of whether the input string is included in the database based on the determination of whether the input string is included in the probabilistic data structure. The determination of whether the input string is included in the database may, in some embodiments, be output at a GUI displayed on a display of the computing device.

Figure 4C:
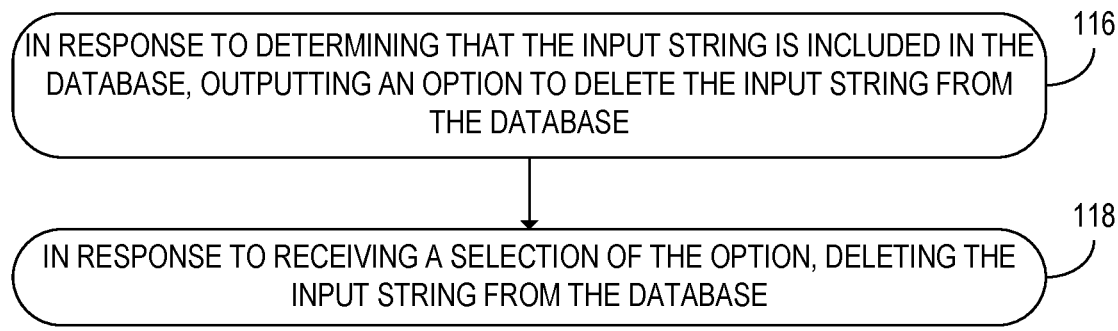

FIG. 4C shows additional steps of the method 100 that may be performed in embodiments in which the method 100 includes the steps shown in FIG. 4B. At step 116, the method 100 may further include, in response to determining that the input string is included in the database, outputting an option to delete the input string from the database. In embodiments in which the determination of whether the input string is included in the database is output at a GUI, the option to delete the input string from the database may also be output at the GUI. At step 118, the method 100 may further include, in response to receiving a selection of the option, deleting the input string from the database. The selection of the option may be received via one or more input devices included in the computing device.

Figure 4D:
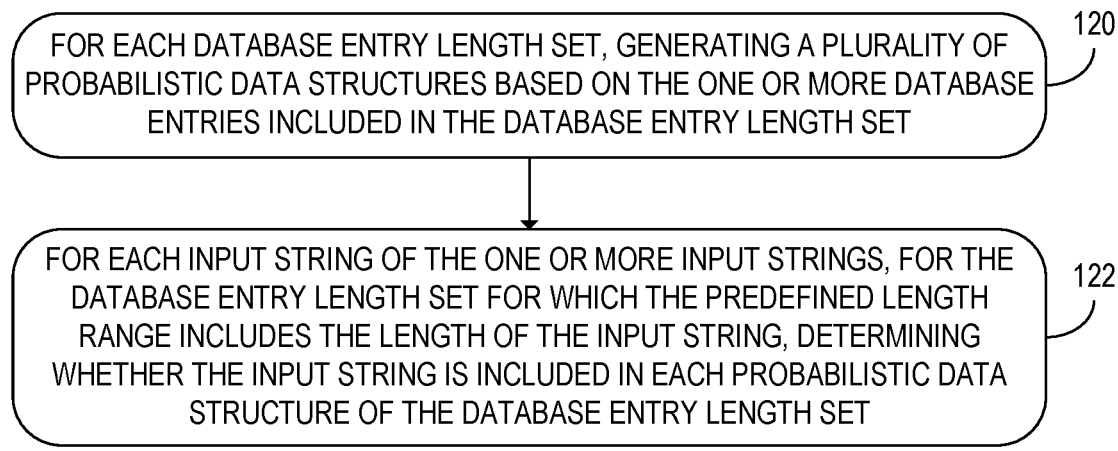

FIG. 4D shows additional steps of the method 100 that may be performed in embodiments in which the method 100 includes the steps shown in FIG. 4B. At step 120, the method 100 may include, for each database entry length set, generating a plurality of probabilistic data structures base on the one or more database entries included in the database entry length set. Step 122 may be further performed for each input string. At step 122, the method 100 may further include, for the database entry length set for which the predefined length range includes the length of the input string, determining whether the input string is included in each probabilistic data structure of the database entry length set. If the input string is determined to not be included in at least one of the probabilistic data structures of the length set, the input string may be determined to not be included in the database. By generating a plurality of probabilistic data structures for each database entry length set, the false positive rate may be reduced.

Figure 4E:
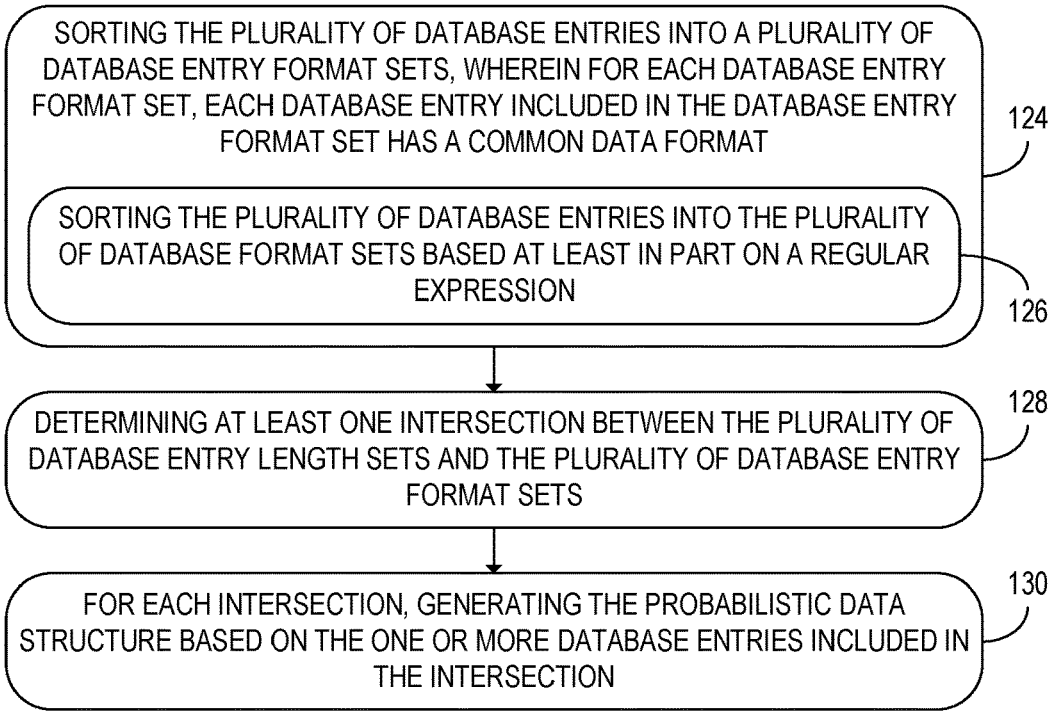

FIG. 4E shows additional steps of the method 100 that may be performed in some embodiments. At step 124, the method 100 may include sorting the plurality of database entries into a plurality of database entry format sets. For each database entry format set, each database entry included in the database entry format set may have a common data format. In some embodiments, step 124 may include, at step 126, sorting the plurality of database entries into the plurality of database format sets based at least in part on a regular expression. In such embodiments, the regular expression may be applied to the plurality of database entries to pre-filter the plurality of database entries by data format before the probabilistic data structures are generated. At step 128, the method 100 may further include determining at least one intersection between the plurality of database entry length sets and the plurality of database entry format sets. At step 130, the method 100 may further include, for each intersection, generating the probabilistic data structure based on the one or more database entries included in the intersection.

Figure 4F:
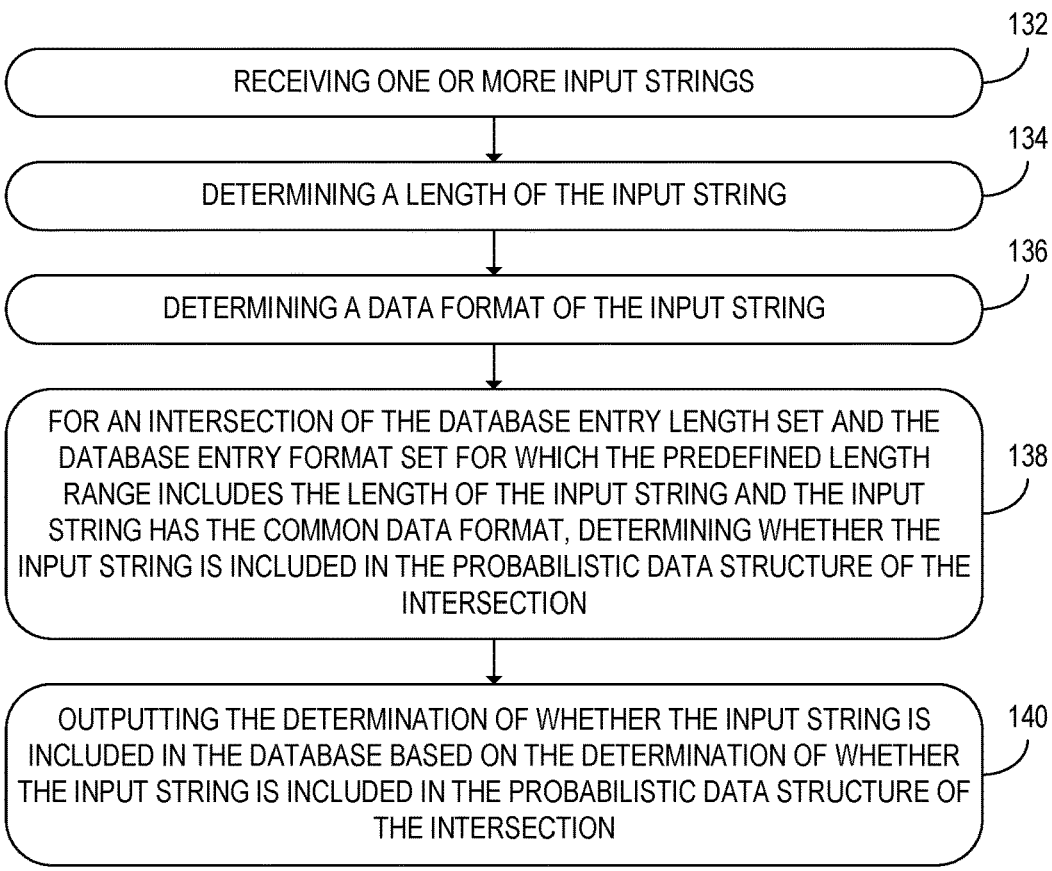

FIG. 4F shows additional steps of the method 100 that may be performed in embodiments in which the method 100 includes the steps shown in FIG. 4E. At step 132, the method 100 may include receiving one or more input strings. For each input string of the one or more input strings, steps 134, 136, 138, and/or 140 may be further performed. At step 134, the method 100 may include determining a length of the input string. At step 136, the method 100 may include determining a data format of the input string. The data format of the input string may be determined, for example, by determining whether the input string matches at least one regular expression. At step 138, for an intersection of the database entry length set and the database entry format set for which the predefined length range includes the length of the input string and the input string has the common data format, the method 100 may further include determining whether the input string is included in the probabilistic data structure of the intersection. At step 140, the method 100 may further include outputting the determination of whether the input string is included in the database based on the determination of whether the input string is included in the probabilistic data structure of the intersection. In embodiments in which the computing device includes a display on which a GUI is displayed, the determination of whether the input string is included in the probabilistic data structure may be output for display at the GUI.

As discussed above, the time complexity for adding or querying for a database entry of the probabilistic data structure may be $O(k)$, where k is the number of hash functions. In contrast, the time complexity of a regular expression search may have time complexity $O(m)$, where m is the number of database entries over which the user is searching. When the regular expression search algorithm also implements features such as backreferencing that allow the regular expression algorithm to recognize classes of languages beyond those that could be recognized by a deterministic or nondeterministic finite automaton, the time complexity of regular expression searching may increase further. When m is large (e.g. millions or billions of database entries), searching for an input string using a regular expression search algorithm may require an extremely large amount of time. Thus, using the systems and methods disclosed above, the amount of time required to search the database for the one or more input strings may be significantly reduced when $k \ll m$.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
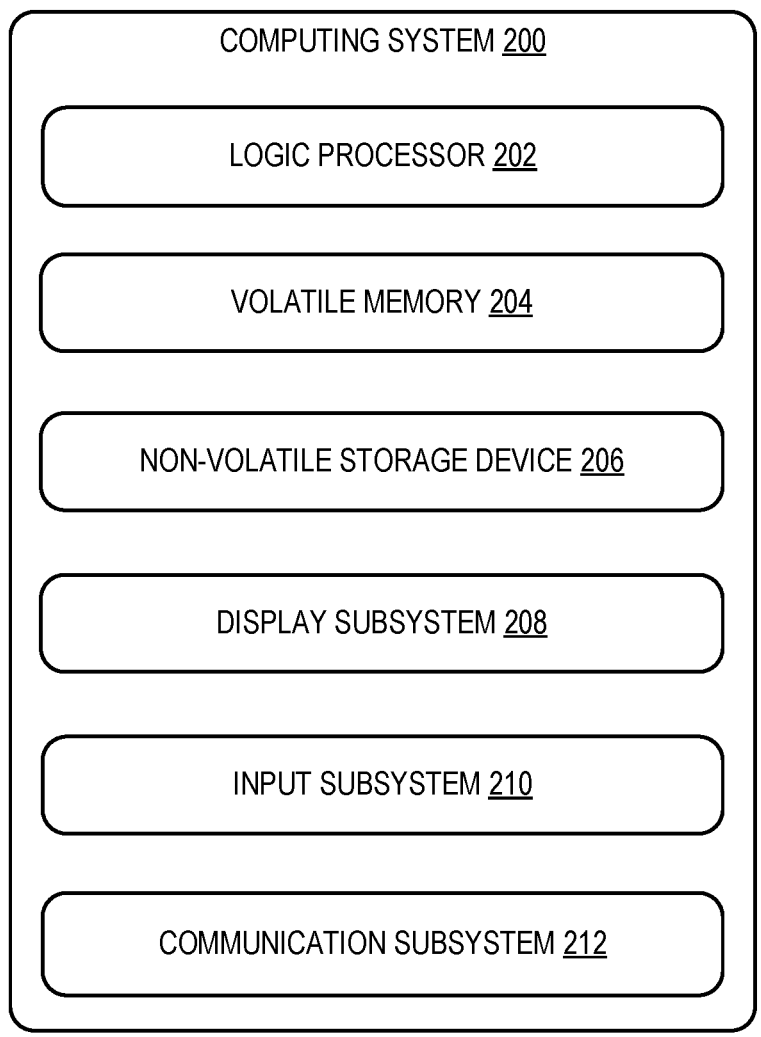
FIG. 5 shows a schematic view of an example computing environment in which the computer device of FIG. 1 may be enacted.

FIG. 5 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 5.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

According to one aspect of the present disclosure, a computing device is provided, including non-volatile memory storing one or more databases including a plurality of database entries. The computing device may further include a processor configured to sort the plurality of database entries into a plurality of database entry length sets. For each database entry length set, each database entry included in the database entry length set may be within a predefined length range. For each database entry length set, the processor may be further configured to generate a probabilistic data structure based on the one or more database entries included in the database entry length set.

According to this aspect, the processor may be further configured to receive one or more input strings. The processor may be further configured to, for each input string of the one or more input strings, determine a length of the input string, and for a database entry length set for which the predefined length range includes the length of the input string, determine whether the input string is included in the probabilistic data structure of the database entry length set. The processor may be further configured to, based on the determination of whether the input string is included in the probabilistic data structure, output a determination of whether the input string is included in the database.

According to this aspect, the processor may be further configured to, for each database entry length set, generate a plurality of probabilistic data structures based on the one or more database entries included in the database entry length set. For each input string of the one or more input strings, for the database entry length set for which the predefined length range includes the length of the input string, the processor may be further configured to determine whether the input string is included in each probabilistic data structure of the database entry length set.

According to this aspect, each probabilistic data structure may be generated using a plurality of hash functions. The plurality of hash functions used to generate each probabilistic data structure may be distinct from the plurality of hash functions used to generate each other probabilistic data structure of the plurality of probabilistic data structures.

According to this aspect, the processor may be further configured to, in response to determining that the input string is included in the database, output an option to delete the input string from the database. In response to receiving a selection of the option, the processor may be further configured to delete the input string from the database.

According to this aspect, the probabilistic data structure may be a Bloom filter.

According to this aspect, the probabilistic data structure may be a counting Bloom filter.

According to this aspect, the processor may be further configured to sort the plurality of database entries into a plurality of database entry format sets, wherein for each database entry format set, each database entry included in the database entry format set has a common data format. The processor may be further configured to determine at least one intersection between the plurality of database entry length sets and the plurality of database entry format sets. For each intersection, the processor may be further configured to generate the probabilistic data structure based on the one or more database entries included in the intersection.

According to this aspect, the processor may be further configured to receive one or more input strings. For each input string of the one or more input strings, the processor may be further configured to determine a length of the input string and determine a data format of the input string. For an intersection of the database entry length set and the database entry format set for which the predefined length range includes the length of the input string and the input string has the common data format, the processor may be further configured to determine whether the input string is included in the probabilistic data structure of the intersection. The processor may be further configured to output the determination of whether the input string is included in the database based on the determination of whether the input string is included in the probabilistic data structure of the intersection.

According to this aspect, the processor may be further configured to sort the plurality of database entries into the plurality of database format sets based at least in part on a regular expression.

According to this aspect, for each database entry length set, each database entry included in the database entry length set may have a common entry length.

According to another aspect of the present disclosure, a method for use with a computing device is provided. The method may include storing a database including a plurality of database entries in non-volatile memory. The method may further include sorting the plurality of database entries into a plurality of database entry length sets, wherein for each database entry length set, each database entry included in the database entry length set is within a predefined length range. The method may further include, for each database entry length set, generating a probabilistic data structure based on the one or more database entries included in the database entry length set.

According to this aspect, the method may further include receiving one or more input strings. For each input string of the one or more input strings, the method may further include determining a length of the input string, and, for a database entry length set for which the predefined length range includes the length of the input string, determining whether the input string is included in the probabilistic data structure of the database entry length set. The method may further include, based on the determination of whether the input string is included in the probabilistic data structure, outputting a determination of whether the input string is included in the database.

According to this aspect, the method may further include, in response to determining that the input string is included in the database, outputting an option to delete the input string from the database. The method may further include, in response to receiving a selection of the option, deleting the input string from the database.

According to this aspect, the probabilistic data structure may be a Bloom filter.

According to this aspect, the probabilistic data structure may be a counting Bloom filter.

According to this aspect, the method may further include sorting the plurality of database entries into a plurality of database entry format sets. For each database entry format set, each database entry included in the database entry format set may have a common data format. The method may further include determining at least one intersection between the plurality of database entry length sets and the plurality of database entry format sets. For each intersection, the method may further include generating the probabilistic data structure based on the one or more database entries included in the intersection.

According to this aspect, the method may further include receiving one or more input strings. For each input string of the one or more input strings, the method may further include determining a length of the input string and determining a data format of the input string. For an intersection of the database entry length set and the database entry format set for which the predefined length range includes the length of the input string and the input string has the common data format, the method may further include determining whether the input string is included in the probabilistic data structure of the intersection. The method may further include outputting the determination of whether the input string is included in the database based on the determination of whether the input string is included in the probabilistic data structure of the intersection.

According to this aspect, the method may further include sorting the plurality of database entries into the plurality of database format sets based at least in part on a regular expression.

According to another aspect of the present disclosure, a computing device is provided, including non-volatile memory storing a database including a plurality of database entries. The computing device may further include a processor configured to sort the plurality of database entries into a plurality of database entry length sets, wherein for each database entry length set, each database entry included in the database entry length set is within a predefined length range. For each database entry length set, the processor may be further configured to generate a plurality of probabilistic data structures based on the one or more database entries included in the database entry length set. Each probabilistic data structure may be generated using a plurality of hash functions. The plurality of hash functions used to generate each probabilistic data structure may be distinct from the plurality of hash functions used to generate each other probabilistic data structure of the plurality of probabilistic data structures.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
    non-volatile memory storing one or more databases including a plurality of database entries; and
    a processor configured to:
        sort the plurality of database entries into a plurality of database entry length sets, wherein for each database entry length set, each database entry included in the database entry length set is within a predefined length range;
        sort the plurality of database entries into a plurality of database entry format sets, wherein for each database entry format set, each database entry included in the database entry format set has a common data format;
        determine at least one intersection between the plurality of database entry length sets and the plurality of database entry format sets; and
        for each intersection, generate a probabilistic data structure based on the one or more database entries included in the intersection, wherein the probabilistic data structure is generated at least in part by applying a plurality of hash functions to the one or more database entries included in the intersection.

2. The computing device of claim 1, wherein the processor is further configured to:
    receive one or more input strings; and
    for each input string of the one or more input strings:
        determine a length of the input string; and
        for a database entry length set for which the predefined length range includes the length of the input string, determine whether the input string is included in the probabilistic data structure of the database entry length set; and
    based on the determination of whether the input string is included in the probabilistic data structure, output a determination of whether the input string is included in the database.

3. The computing device of claim 2, wherein the processor is further configured to:
    for each database entry length set, generate a plurality of probabilistic data structures based on the one or more database entries included in the database entry length set; and
    for each input string of the one or more input strings, for the database entry length set for which the predefined length range includes the length of the input string, determine whether the input string is included in each probabilistic data structure of the database entry length set.

4. The computing device of claim 3, wherein
    the plurality of hash functions used to generate each probabilistic data structure is distinct from the plurality of hash functions used to generate each other probabilistic data structure of the plurality of probabilistic data structures.

5. The computing device of claim 2, wherein the processor is further configured to:
    in response to determining that the input string is included in the database, output an option to delete the input string from the database; and
    in response to receiving a selection of the option, delete the input string from the database.

6. The computing device of claim 1, wherein the probabilistic data structure is a Bloom filter.

7. The computing device of claim 1, wherein the probabilistic data structure is a counting Bloom filter.

8. The computing device of claim 1, wherein the processor is further configured to:
    receive one or more input strings; and
    for each input string of the one or more input strings:
        determine a length of the input string;
        determine a data format of the input string;
        for an intersection of the database entry length set and the database entry format set for which the predefined length range includes the length of the input string and the input string has the common data format, determine whether the input string is included in the probabilistic data structure of the intersection; and
        output the determination of whether the input string is included in the database based on the determination of whether the input string is included in the probabilistic data structure of the intersection.

9. The computing device of claim 1, wherein the processor is further configured to sort the plurality of database entries into the plurality of database format sets based at least in part on a regular expression.

10. The computing device of claim 1, wherein, for each database entry length set, each database entry included in the database entry length set has a common entry length.

11. A method for use with a computing device, the method comprising:
    storing a database including a plurality of database entries in non-volatile memory;
    sorting the plurality of database entries into a plurality of database entry length sets, wherein for each database entry length set, each database entry included in the database entry length set is within a predefined length range;
    sorting the plurality of database entries into a plurality of database entry format sets, wherein for each database entry format set, each database entry included in the database entry format set has a common data format;
    determining at least one intersection between the plurality of database entry length sets and the plurality of database entry format sets; and
    for each intersection, generating a probabilistic data structure based on the one or more database entries included in the intersection, wherein the probabilistic data structure is generated at least in part by applying a plurality of hash functions to the one or more database entries included in the intersection.

12. The method of claim 11, further comprising:
receiving one or more input strings; and
for each input string of the one or more input strings:
  determining a length of the input string; and
  for a database entry length set for which the predefined length range includes the length of the input string, determining whether the input string is included in the probabilistic data structure of the database entry length set; and
  based on the determination of whether the input string is included in the probabilistic data structure, outputting a determination of whether the input string is included in the database.

13. The method of claim 12, further comprising:
in response to determining that the input string is included in the database, outputting an option to delete the input string from the database; and
in response to receiving a selection of the option, deleting the input string from the database.

14. The method of claim 11, wherein the probabilistic data structure is a Bloom filter.

15. The method of claim 11, wherein the probabilistic data structure is a counting Bloom filter.

16. The method of claim 11, further comprising:
receiving one or more input strings; and
for each input string of the one or more input strings:
  determining a length of the input string;
  determining a data format of the input string;
  for an intersection of the database entry length set and the database entry format set for which the predefined length range includes the length of the input string and the input string has the common data format, determining whether the input string is included in the probabilistic data structure of the intersection; and
  outputting the determination of whether the input string is included in the database based on the determination of whether the input string is included in the probabilistic data structure of the intersection.

17. The method of claim 11, further comprising sorting the plurality of database entries into the plurality of database format sets based at least in part on a regular expression.

18. A computing device, comprising:
non-volatile memory storing a database including a plurality of database entries; and
a processor configured to:
  sort the plurality of database entries into a plurality of database entry length sets, wherein for each database entry length set, each database entry included in the database entry length set is within a predefined length range;
  sort the plurality of database entries into a plurality of database entry format sets, wherein for each database entry format set, each database entry included in the database entry format set has a common data format;
  determine at least one intersection between the plurality of database entry length sets and the plurality of database entry format sets; and
  for each intersection, generate a plurality of probabilistic data structures based on the one or more database entries included in the intersection, wherein:
    each probabilistic data structure is generated at least in part by applying a plurality of hash functions to the one or more database entries included in the intersection; and
    the plurality of hash functions used to generate each probabilistic data structure is distinct from the plurality of hash functions used to generate each other probabilistic data structure of the plurality of probabilistic data structures.

* * * * *